United States Patent
Forster et al.

(10) Patent No.: US 11,156,250 B2
(45) Date of Patent: Oct. 26, 2021

(54) BEARING ASSEMBLY

(71) Applicant: Aktiebolaget SKF, Gothenburg (SE)

(72) Inventors: Thomas Forster, Waidhofen/Ybbs (AT); Johann Huber, St. Peter/Au (AT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/195,311

(22) Filed: Nov. 19, 2018

(65) Prior Publication Data
US 2019/0186535 A1    Jun. 20, 2019

(30) Foreign Application Priority Data

Dec. 14, 2017    (DE) ........................ 102017222792.3

(51) Int. Cl.
| | |
|---|---|
| *F16C 19/06* | (2006.01) |
| *F16C 19/16* | (2006.01) |
| *F16C 19/54* | (2006.01) |
| *F16C 33/30* | (2006.01) |
| *F16C 33/58* | (2006.01) |
| *F16C 25/08* | (2006.01) |
| *F16C 33/60* | (2006.01) |
| *F16C 13/00* | (2006.01) |

(52) U.S. Cl.
CPC .............. *F16C 19/16* (2013.01); *F16C 19/54* (2013.01); *F16C 33/583* (2013.01); *F16C 33/60* (2013.01); *F16C 13/006* (2013.01); *F16C 19/06* (2013.01); *F16C 25/083* (2013.01); *F16C 33/303* (2013.01); *F16C 2223/30* (2013.01); *F16C 2360/31* (2013.01); *F16C 2380/26* (2013.01)

(58) Field of Classification Search
CPC ...... F16C 13/006; F16C 19/16; F16C 25/083; F16C 33/583; F16C 33/60; F16C 2223/30; F16C 2360/31; F16C 2380/26; F16C 33/765; F16C 33/82
USPC ....... 384/492, 502, 513, 517, 535, 563–565, 384/615, 504, 498; 267/47, 64.2, 207, 267/280

See application file for complete search history.

(56) References Cited

U.S. PATENT DOCUMENTS

| | | | | |
|---|---|---|---|---|
| 2,174,854 A | * | 10/1939 | Corwin ................. | F16C 37/00 184/6.26 |
| 2,676,853 A | * | 4/1954 | Shafer .................. | F16C 23/084 384/207 |
| 2,893,790 A | * | 7/1959 | Raes ...................... | B60K 17/24 384/536 |
| 3,351,398 A | * | 11/1967 | Park ...................... | F16C 19/26 384/456 |

(Continued)

FOREIGN PATENT DOCUMENTS

| | | | | |
|---|---|---|---|---|
| GB | 802858 A | * | 10/1958 | ............ B64C 11/325 |
| JP | 58163821 A | * | 9/1983 | .............. F16C 33/62 |

(Continued)

*Primary Examiner* — Marcus Charles
(74) *Attorney, Agent, or Firm* — J-TEK Law PLLC; Scott T. Wakeman; Mark A. Ussai

(57) ABSTRACT

A bearing assembly includes a first locating bearing and a second locating bearing configured to be mounted on a shaft. The first locating bearing includes a two-part outer ring formed from a radially inward outer ring and a radially outward outer ring, and a diameter of the inward outer ring is smaller than a diameter of the outward outer ring.

18 Claims, 3 Drawing Sheets

(56) References Cited

U.S. PATENT DOCUMENTS

| | | | | |
|---|---|---|---|---|
| 4,438,989 A | * | 3/1984 | Negele | F16C 19/163 384/477 |
| 4,611,933 A | * | 9/1986 | Hofmann | B62K 19/34 384/458 |
| 5,735,615 A | * | 4/1998 | Pontzer | F16C 35/00 384/476 |
| 5,954,880 A | * | 9/1999 | Aoki | C23C 2/003 118/419 |
| 7,744,284 B2 | * | 6/2010 | Tada | F16C 13/006 384/537 |
| 8,231,279 B2 | * | 7/2012 | Falsetti | F16C 23/084 384/498 |
| 8,636,419 B2 | * | 1/2014 | Mola | F16C 13/006 29/898.063 |
| 2007/0009194 A1 | * | 1/2007 | Schelbert | F16C 21/00 384/537 |
| 2007/0253656 A1 | * | 11/2007 | Tanner | F16C 23/084 384/492 |
| 2014/0219598 A1 | * | 8/2014 | Grosskopf | F16C 23/08 384/495 |
| 2016/0083006 A1 | * | 3/2016 | Kimpian | F16C 25/083 180/444 |

FOREIGN PATENT DOCUMENTS

| | | | | |
|---|---|---|---|---|
| JP | 60205018 A | * | 10/1985 | F16C 33/60 |
| JP | S60205018 A | * | 10/1985 | F16C 33/765 |
| JP | 07208460 A | * | 8/1995 | F16C 25/08 |
| JP | 10146013 A | * | 5/1998 | F16C 27/04 |
| JP | 2004144154 A | * | 5/2004 | F16C 33/62 |

* cited by examiner

BEARING ASSEMBLY

CROSS-REFERENCE

This application claims priority to German patent application no. 10 2017 222 792.3 filed on Dec. 14, 2017, the contents of which are fully incorporated herein by reference.

TECHNOLOGICAL FIELD

The present disclosure is directed to a bearing assembly including two locating bearings that are mountable on a shaft.

BACKGROUND

In various applications, such as, for example, electric motors or wind-turbine generators, a combination of two bearings can be used. For example, in order to support a shaft in a housing a combination of a non-locating (or fixed) bearing and a locating (or movable or floating) bearing can be used. Here the locating bearing usually fixedly supports the shaft in the housing. In order to allow the shaft to be displaced, a non-locating bearing is used as the second bearing. Such a displacement can be necessary in order to compensate for manufacturing tolerances of the bearings or for a deformation, such as a thermal expansion, of the elements, for example, of the bearing or of the shaft. For this purpose the non-locating bearing usually has a sliding seat in the bearing housing, which seat ensures a displaceability of the bearing.

However, since in operation a friction corrosion (also called fretting) can arise in particular between an outer ring of the non-locating bearing and the housing of the non-locating bearing, the displacement can be blocked in extreme cases. In this way very high bearing forces and thus a later failure of the bearing can be caused.

A cylindrical roller bearing can also be combined with a deep groove ball bearing. Here both bearings can be fixedly mounted since the axial displacement can be accommodated by the cylindrical roller bearing. However, a linear contact of the inner ring, outer ring, and of the rollers occurs in the cylindrical roller bearing, and this causes disadvantages in the grease service life and the bearing friction. Furthermore, the cylindrical ceramic rollers frequently used here are expensive.

SUMMARY

It is therefore an aspect of the present disclosure to provide a bearing assembly that has an improved service life.

A bearing assembly according to the present disclosure includes two locating bearings that are mountable on a common shaft. In order to allow for an axial displacement of a shaft relative to the two bearings, at least one of the two locating bearings includes a two-part outer ring. The two-part outer ring is comprised of a radially inward outer ring and a radially outward outer ring. Here an inner ring of this locating bearing is fixedly attached to the shaft, and the outward outer ring of the locating bearing is fixedly attached to an element around the shaft, for example, a housing. The diameter of the inward outer ring is smaller than the diameter of the outward outer ring, and the diameter of the two outer rings of the two-part outer ring are selected such that the two outer rings fit one-into-the-other. The inner diameter of the outward outer ring is preferably smaller than the outer diameter of the inward outer ring in order to make displacement possible If a deformation or expansion of the elements occurs, for example, of the bearings or of the shaft, the inward and the outward outer ring can be axially displaced against each other in order to compensate for this deformation or expansion. Such a deformation or expansion can occur, for example, with the use of different materials for the individual elements due to the different heat coefficients associated therewith and thus the different expansions of the elements. The deformation or expansion of the elements is in particular a change in the length of the shaft in the axial direction. Due to this change in length, an exertion of force on the locating bearings can occur, which can be accommodated by the two-part outer ring of at least one bearing.

In particular, the two outer rings of the one bearing are axially displaceable against each other. Due to this arrangement, deformations or expansions of the shaft can be accommodated particularly advantageously.

According to one embodiment, the axial dimensions of the inward outer ring are smaller than the axial dimensions of the outward outer ring. In this way the inward outer ring can be displaced axially with respect to the outward outer ring without the inward projecting beyond the outward outer ring. The axial dimensions of the outward outer ring preferably correspond to the axial dimensions of the inner ring of the locating bearing.

According to a further embodiment, the locating bearings are rolling-element bearings. In particular, one or both of the locating bearings can be a ball bearing, in particular a deep-groove ball bearing. Due to the use of two ball bearings, in particular deep-groove ball bearings, in comparison to the use of cylindrical roller bearings the grease service life can be increased and the friction can be reduced. The wear of the bearing can thus be reduced and the service life extended. This thus also leads to cost reductions.

According to a further embodiment, the rolling-element bearings include rolling elements that are manufactured from ceramic. Ceramic rolling elements offer particularly low wear and thus a long service life of the bearing. This in turn leads to a longer service life of the bearing and thus also to cost reductions.

At least one of the locating bearings can include a spring element that is disposed in the bearing interior of the locating bearing. This spring element interacts with the inward outer ring in order to apply an axial preload on the inward outer ring. Since the spring element can be disposed within the bearing interior, a particularly compact design of the entire bearing assembly is possible. This is possible in particular since the inward outer ring has smaller axial dimensions than the outward outer ring, whereby space is available for the spring element.

The inward outer ring and the outward outer ring can be comprised of different materials. Alternatively or additionally a coating can be disposed between the inward outer ring and the outward outer ring.

In particular, the materials of the outer rings and/or the coating can be selected such that a particularly good slippage arises between the mutually abutting surfaces of the two outer rings. For example, one of the outer rings can be manufactured from a plastic material.

Alternatively the materials of the outer rings and/or the coating can be selected such that a particularly good static friction arises between the mutually abutting surfaces of the two outer rings. In this way it can be achieved that the two outer rings are not too easily displaced against each other, but rather a displacing only occurs when, due to a deformation of the shaft, a certain force is exerted on the locating bearing.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail on the basis of the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
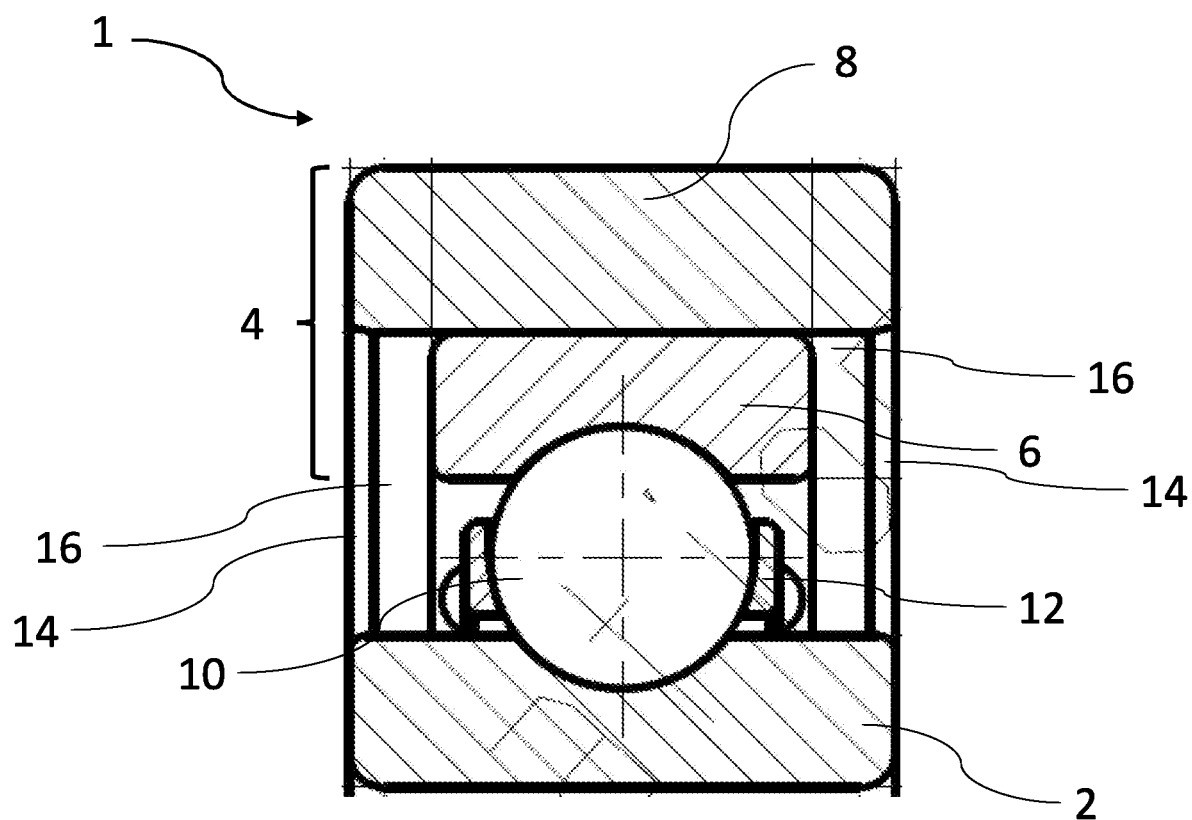
FIG. 1 is a sectional view of a locating bearing including a two-part outer ring according to a first embodiment of the disclosure.
Figure 3:
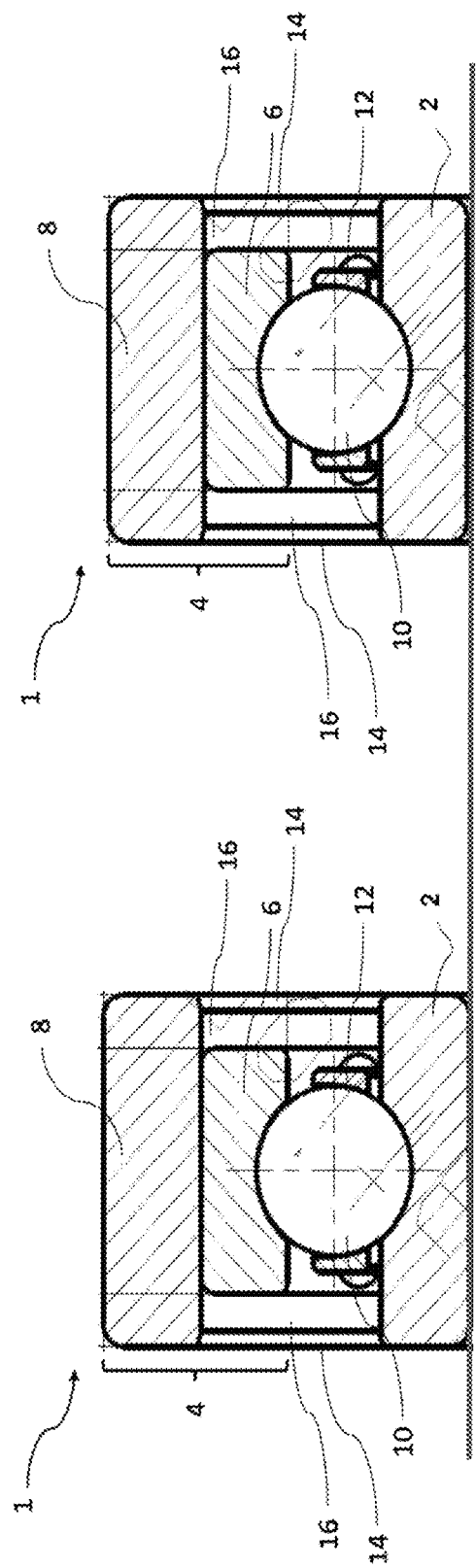
FIG. 3 is a sectional view of two of the locating bearings according to FIG. 1 mounted on a shaft.

FIG. 1 shows a bearing 1 that is configured as a locating bearing including a two-part outer ring. This locating bearing 1 can be used in combination with a second locating bearing (see, e.g., FIG. 3), in order, for example, to support a shaft in a housing. Here the second locating bearing can be configured with a one-part outer ring.

The locating bearing 1 includes an inner ring 2 and a two-part outer ring 4. Here the two-part outer ring 4 is comprised of two rings disposed radially one-over-the-other, an inward outer ring 6 and an outward outer ring 8. Here the rings 6, 8 are axially displaceable against each other. The locating bearing 1 further includes rolling elements 10 that can be held in a cage 12.

In the axial direction the locating bearing 1 includes a housing 14 between the outer ring 4 and the inner ring 2. As shown in FIG. 1 the axial dimensions of the inward outer ring 6 are smaller than the axial dimensions of the outward outer ring 8. In this way the inward outer ring 6 can move axially with a clearance 16 with respect to the outward outer ring 8 without projecting beyond the outer ring 8.

Due to the two-part outer ring 4 it is possible to mount two locating bearings fixedly on a shaft since the necessary displaceability that can be required due to tolerances, thermal expansion, or deformation can be accommodated by the inward outer ring 6 and the outward outer ring 8.

The mutually adjacent surfaces of the inward outer ring 6 and of the outward outer ring 8 can be provided with a coating. This coating can be selected such that a particularly good slippage between the two rings 6, 8 is ensured. In this way a displacement of the rings 6, 8 against each other can occur, whereby wear of the surfaces is reduced. If instead of particularly good slippage, the coating is selected such that a certain static friction is provided, the rings 6, 8 can be prevented from displacing against each other with the slightest deformations/expansions. Here a displacement of the rings 6, 8 occurs only when a certain minimum force is exerted on the bearing 1.

Figure 2:
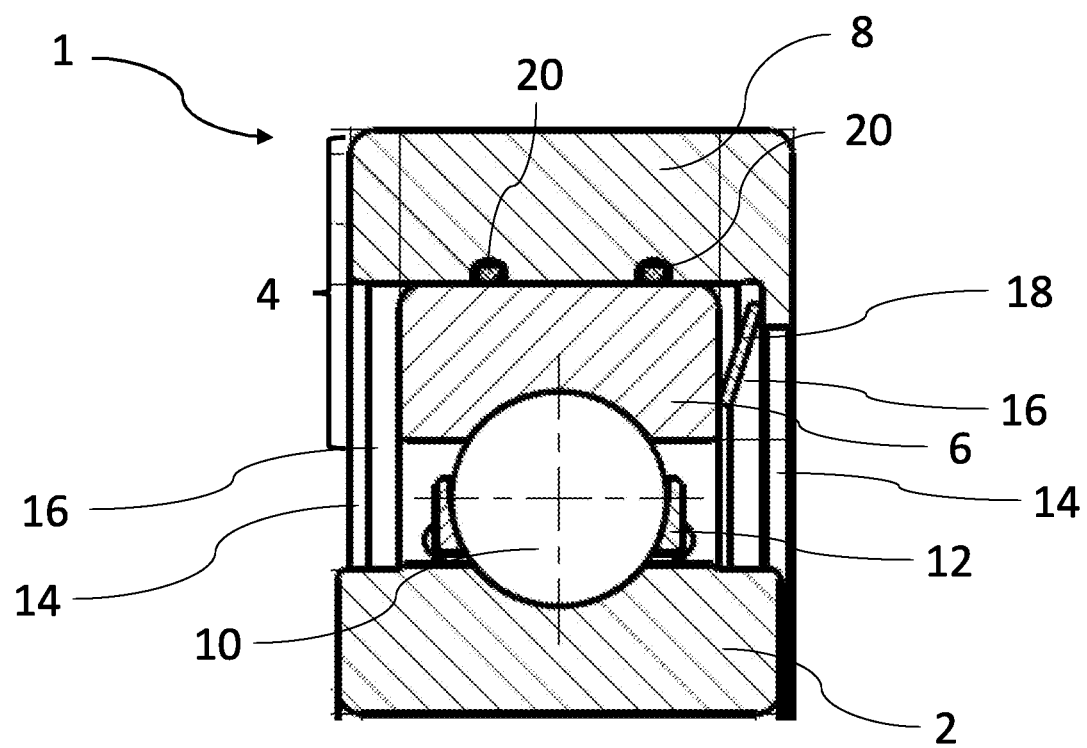
FIG. 2 is a sectional view of a locating bearing including a two-part outer ring according to a second embodiment of the disclosure.

FIG. 2 shows a second embodiment of a locating bearing 1 that includes a spring element 18. This spring element 18 can be, for example, a cup spring that is disposed in the intermediate space 16. The spring element 18 can be supported on one side against the inward outer ring 6 and on the other side against the housing 14. In FIG. 2 the outward outer ring 8 is drawn downward on one side and thus represents a part of the housing 14 against which the spring element 18 is supported. Due to the spring element 18 the inward outer ring 6 can be acted upon with a preload in order to fix a certain position of the inward outer ring 6 in the bearing 1.

Furthermore two O-rings 20 are provided on the outward outer ring 8. These are located between the outward outer ring 8 and the inward outer ring 6 and serve to prevent a mutual twisting of the two outer rings 6, 8 in the circumferential direction. In this way apart from the desired axial displacement, each movement of the two outer rings 6, 8 with respect to each other can be prevented.

Due to the disclosed locating bearing it is possible to provide a bearing assembly including two locating bearings, which bearings can be fixedly mounted on a shaft, wherein an axial displacement of the bearing assembly is provided by the two-part outer ring of at least one of the two locating bearings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Inner ring
4 Outer ring
6 Inward outer ring
8 Outward outer ring 10 Rolling element
12 Cage
14 Housing
16 Clearance
18 Spring element
20 O-ring

What is claimed is:

1. A bearing assembly comprising: a first locating bearing and a second locating bearing configured to be mounted on a shaft, wherein the first locating bearing includes a two-part outer ring formed from a radially inward outer ring and a radially outward outer ring, and wherein a diameter of the inward outer ring is smaller than a diameter of the outward outer ring, such that the inward outer ring and the outward outer ring are axially displaceable against each other to compensate for the shaft deformation.

2. The bearing assembly according to claim 1, wherein an axial length of the inward outer ring is less than an axial length of the outward outer ring.

3. The bearing assembly according to claim 1, wherein the first locating bearing further comprises:
   an inner ring configured to be mounted on the shaft and the inner ring positioned radially inward relative to the two-part outer ring, and
   at least one rolling element disposed between the inner ring and the two-part outer ring.

4. The bearing assembly according to claim 3, wherein the first locating bearing further comprises:
   a first groove disposed in the radially inward outer ring, the first groove facing radially inward; and
   a second groove disposed in the inner ring, the second groove facing the radially outward,
   wherein the at least one rolling element is disposed between the first groove and the second groove.

5. The bearing assembly according to claim 3, wherein the at least one rolling-element comprises a ceramic material.

6. The bearing assembly according to claim 3, wherein the inner ring and the outward outer ring are both axially longer than the inward outer ring.

7. The bearing assembly according to claim 6, wherein the radially inward outer ring is formed as one piece.

8. The bearing assembly according to claim 1, wherein the first locating bearing includes a spring element disposed in an interior space of the bearing.

9. The bearing assembly according to claim 1, wherein the inward outer ring and the outward outer ring are formed from different materials.

10. The bearing assembly according to claim 1, wherein a coating is disposed between the inward outer ring and the outward outer ring.

11. The bearing assembly according to claim 1, wherein a radially outer surface of the inward outer ring directly contacts a radially inner surface of the inward outer ring.

12. The bearing assembly according to claim 1, wherein the inward outer ring and the outward outer ring are linearly axially displaceable against each other.

13. The bearing assembly according to claim 1, wherein the radially outward outer ring includes a flange, and further including a spring between the flange and the radially inward outer ring.

14. A bearing assembly comprising:
   a first locating bearing and a second locating bearing configured to be mounted on a shaft,
   wherein the first locating bearing includes a two-part outer ring formed from a radially inward outer ring and a radially outward outer ring, and wherein a diameter of the inward outer ring is smaller than a diameter of the outward outer ring,
   wherein the inward outer ring and the outward outer ring are axially displaceable against each other,
   wherein an axial length of the inward outer ring is less than an axial length of the outward outer ring,
   wherein the first locating bearing and the second locating bearing are rolling-element bearings,
   wherein the inward outer ring and the outward outer ring are formed from different materials, and
   wherein a coating is disposed between the inward outer ring and the outward outer ring.

15. A bearing assembly comprising: a first locating bearing and a second locating bearing mounted on a shaft, wherein the first locating bearing includes a two-part outer ring formed from a radially inward outer ring having a radially outer surface and a radially outward outer ring having a radially inner surface in direct contact with the radially outer surface of the inward outer ring, wherein a diameter of the inward outer ring is smaller than a diameter of the outward outer ring, such that the inward outer ring and the outward outer ring are axially displaceable against each other to compensate for the shaft deformation, and wherein an axially length of the inward outer ring is less than an axial length of the outward outer ring.

16. The bearing assembly according to claim 14, wherein the radially outward outer ring includes a flange, and further including a spring between the flange and the radially inward outer ring.

17. The bearing assembly according to claim 14, wherein the radially inward outer ring is formed as one piece,
   wherein the first locating bearing includes an inner ring mounted on the shaft, the inner ring being positioned radially inward relative to the two-part outer ring, and
   at least one rolling element disposed between the inner ring and the two-part outer ring,
   wherein the inner ring and the outward outer ring are both axially longer than the radially inward outer ring.

18. The bearing assembly according to claim 14, wherein the inward outer ring and the outward outer ring are linearly axially displaceable against each other.

* * * * *